US012568329B2

(12) United States Patent
Tsuchihashi

(10) Patent No.: US 12,568,329 B2
(45) Date of Patent: Mar. 3, 2026

(54) SPEAKER UNIT

(71) Applicant: Yamaha Corporation, Hamamatsu (JP)

(72) Inventor: Yuu Tsuchihashi, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 160 days.

(21) Appl. No.: 18/405,375

(22) Filed: Jan. 5, 2024

(65) Prior Publication Data

US 2024/0147141 A1 May 2, 2024

Related U.S. Application Data

(63) Continuation of application No. PCT/JP2022/027122, filed on Jul. 8, 2022.

(30) Foreign Application Priority Data

Jul. 8, 2021 (JP) ................................ 2021-113261

(51) Int. Cl.
*H04R 1/28* (2006.01)
*H04R 7/12* (2006.01)
*H04R 1/10* (2006.01)

(52) U.S. Cl.
CPC ........... *H04R 1/2811* (2013.01); *H04R 7/127* (2013.01); *H04R 1/1008* (2013.01)

(58) Field of Classification Search
CPC ..... H04R 1/2811; H04R 1/1008; H04R 7/127
USPC ................. 381/337-339, 345, 347, 350, 430
See application file for complete search history.

(56) References Cited

U.S. PATENT DOCUMENTS

| | | | | | |
|---|---|---|---|---|---|
| 3,013,127 | A * | 12/1961 | Christensen | H04R 11/00 | 381/345 |
| 5,844,998 | A | 12/1998 | Nageno | | |
| 6,130,951 | A * | 10/2000 | Nakamura | H04R 17/10 | 381/345 |
| 6,351,542 | B2 * | 2/2002 | Azima | H04R 5/027 | 381/345 |
| 8,509,459 | B1 * | 8/2013 | Isvan | H04R 19/016 | 381/357 |
| 2001/0030474 | A1 | 10/2001 | Sakai et al. | | |
| 2011/0064260 | A1 * | 3/2011 | Andersen | H04R 7/20 | 381/430 |

FOREIGN PATENT DOCUMENTS

| | | |
|---|---|---|
| EP | 1 145 770 A2 | 10/2001 |
| GB | 2 313 248 A | 11/1997 |

(Continued)

OTHER PUBLICATIONS

English transiation of document C2 (Japanese-language Written Opinion (PCT/ISA/237), fied on Jan. 5, 2024) issued in PCT Application No. PCT/JP2022/027122 dated Oct. 4, 2022 (4 pages).

(Continued)

*Primary Examiner* — Suhan Ni
(74) *Attorney, Agent, or Firm* — Crowell & Moring LLP

(57) ABSTRACT

A speaker unit includes a diaphragm and a plate. The diaphragm is supported on a frame The plate includes an outer peripheral portion. The outer peripheral portion is supported on the frame. The plate defines a space surrounded by the outer peripheral portion between the plate and the diaphragm and having an opening at a center of the plate. A distance between an edge of the opening and the outer peripheral portion is in a range of 8 mm to 42 mm.

11 Claims, 3 Drawing Sheets

(56) References Cited

FOREIGN PATENT DOCUMENTS

| | | | |
|---|---|---|---|
| JP | 54-44526 | U | 3/1979 |
| JP | 56-156099 | A | 12/1981 |
| JP | 57-65093 | A | 4/1982 |
| JP | 57-48777 | U | 9/1982 |
| JP | 10-32892 | A | 2/1998 |
| JP | 2001-293436 | A | 10/2001 |
| JP | 2006-217252 | A | 8/2006 |
| JP | 2012-500535 | A | 1/2012 |
| JP | 2016-127527 | A | 7/2016 |
| JP | 2017-158060 | A | 9/2017 |
| WO | WO 2010/019846 | A1 | 2/2010 |

OTHER PUBLICATIONS

Japanese-language Office Action issued in Japanese Application No. 2021-113261 dated May 20, 2025 with English translation (8 pages).

International Search Report (PCT/ISA/210) issued in PCT Application No. PCT/JP2022/027122 dated Oct. 4, 2022 with English translation (5 pages).

Japanese-language Written Opinion (PCT/ISA/237) issued in PCT Application No. PCT/JP2022/027122 dated Oct. 4, 2022 with English translation (6 pages).

Japanese-language Office Action issued in Japanese Application No. 2021-113261 dated Mar. 4, 2025 with English translation (12 pages).

* cited by examiner

SPEAKER UNIT

CROSS-REFERENCE TO RELATED APPLICATIONS

This is a continuation of International Application No. PCT/JP2022/027122 filed on Jul. 8, 2022, and claims priority from Japanese Patent Application No. 2021-113261 filed on Jul. 8, 2021, the entire content of which is incorporated herein by reference.

TECHNICAL FIELD

The present disclosure relates to a speaker unit suitable for a headphone and the like.

BACKGROUND

JPS57-048777U, JPS56-156099A and JPH10-032892A disclose techniques for adjusting the sound pressure frequency characteristic of a headphone. In the technique disclosed in JPS57-048777U, an equalizer in which a front sound hole is formed over substantially an entire region is provided in front of a diaphragm of a headphone, and a side sound hole for performing acoustic correction is formed between the equalizer and the diaphragm. In the technique disclosed in JPS56-156099A, an equalizer that adjusts the high frequency characteristic is provided in front of a diaphragm. In the technique in JPS56-156099A, a sound hole is also formed over substantially an entire region of the equalizer (see FIG. 1 of JPS56-156099A). In the technique disclosed in JPH10-032892A, an acoustic equalizer is provided at a position facing an acoustic unit and close to the ear of a user. The acoustic equalizer is formed with a hole and a hole covered with a non-woven fabric.

SUMMARY

In designing a speaker unit such as a headphone, a diffused field curve and a free field curve are used as indicators of the sound pressure frequency characteristic (hereinafter referred to as DF/FF). Generally speaking, the DF is a sound pressure frequency characteristic of a radiated sound acquired by a microphone inside a dummy head when the dummy head is placed in a reverberation chamber and the speaker unit is placed on the front, and the FF is a sound pressure frequency characteristic of a radiated sound acquired by the microphone inside the dummy head when the dummy head is placed in an anechoic chamber and the speaker unit is placed on the front. These characteristics are sound field characteristics in two extreme environments such as the reverberation chamber and the anechoic chamber, and are often considered by a designer as a starting point when tuning the sound pressure frequency characteristic of the headphone.

A DF curve and an FF curve have significantly different characteristics in a high range of 1 kHz to 2 kHz or higher. In the high range in which the difference between the DF curve and the FF curve is large, a standing wave (an acoustic mode) of a sound is generated inside a headphone housing or in a space in front of a driver unit formed by an ear pad and the head, and a phenomenon occurs in which the characteristic changes by generating a peak dip in the frequency characteristic of the radiated sound. Therefore, when designing a headphone with the DF curve or the FF curve as a target, it is necessary to adjust the sound pressure frequency characteristic with high precision targeting a specific high frequency band.

However, the techniques in JPS57-048777U, JPS56-156099A and JPH10-032892A described above have a problem in that it is difficult to adjust the sound pressure frequency characteristic with high precision targeting such a specific band.

The present disclosure has been made in view of the circumstances described above, and an object of the present disclosure is to enable adjustment of the sound pressure frequency characteristic with high precision targeting a specific band in a speaker unit.

The present disclosure provides a speaker unit including: a diaphragm supported on a frame; and a plate including an outer peripheral portion, the outer peripheral portion being supported on the frame, in which the plate defines a space surrounded by the outer peripheral portion between the plate and the diaphragm and has an opening at a center of the plate, and a distance between an edge of the opening and the outer peripheral portion is in a range of 8 mm to 42 mm.

BRIEF DESCRIPTION OF DRAWINGS

The present disclosure will be described in detail based on the following without being limited thereto, wherein.

DETAILED DESCRIPTION

Hereinafter, embodiments of the present disclosure will be described with reference to the drawings.

Figure 1:
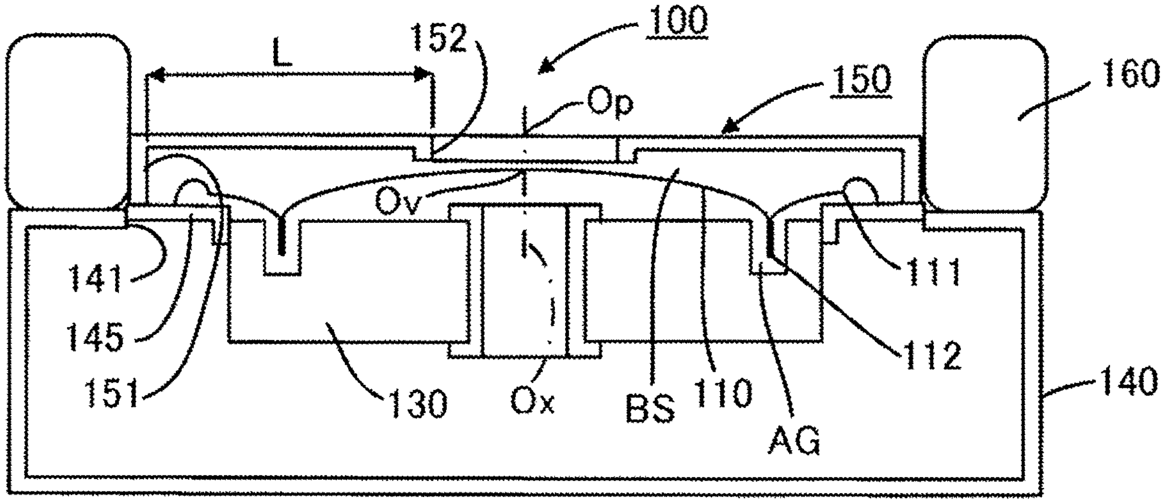
FIG. 1 is a cross-sectional view showing a configuration of a headphone driver that is an embodiment of a speaker unit according to the present disclosure.
Figure 2:
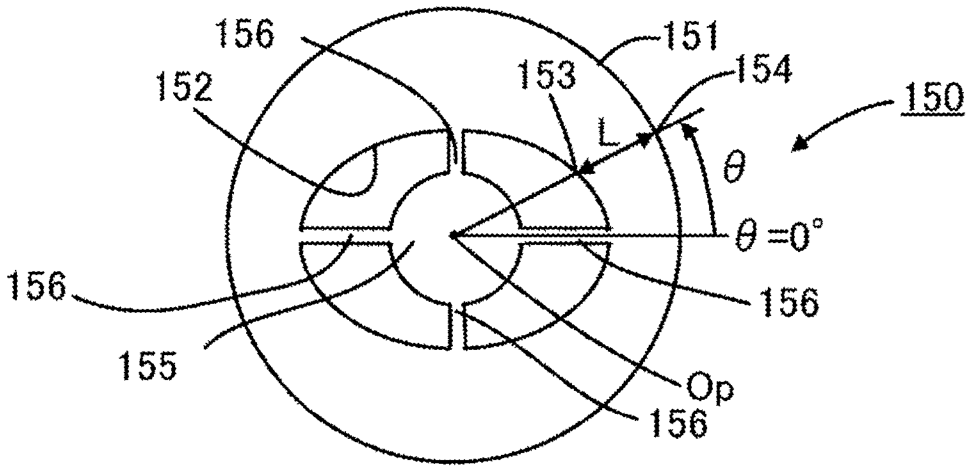
FIG. 2 is a plan view showing a configuration of a plate according to the present disclosure.

FIG. 1 is a cross-sectional view showing a configuration of a headphone driver 100 that is an embodiment of a speaker unit according to the present disclosure. FIG. 2 is a plan view of a plate 150 of the headphone driver 100 as viewed from above in FIG. 1. The headphone driver 100 includes a diaphragm 110, a peripheral portion 111, a voice coil bobbin 112, a magnetic circuit 130, a housing 140, a frame 145, the plate 150, and an ear pad 160.

In FIG. 1, an upward direction is a sound emission direction. The housing 140 has a hollow cylindrical shape and has an opening 141 on an upper wall surface of the housing 140. The outer periphery of the substantially circular frame 145 is fixed inside the opening 141. The inner periphery of the frame 145 is bent downward in FIG. 1.

The diaphragm 110 has a dome shape. The outer periphery of a dome-shaped portion is surrounded by the substantially annular peripheral portion 111 called an edge. The outer periphery of the diaphragm 110 is supported on an upper surface of the frame 145 via the peripheral portion 111.

The hollow cylindrical voice coil bobbin 112 facing downward is provided on the outer periphery of the diaphragm 110. A voice coil is wound around the voice coil bobbin 112 (not shown).

The magnetic circuit 130 is fixed in the housing 140. The magnetic circuit 130 has an annular shape, and has an annular magnetic gap AG on a surface of the magnetic circuit 130 in the sound emission direction. The voice coil bobbin 112 is inserted into the magnetic gap AG.

The substantially annular ear pad 160 is provided on an upper surface of the housing 140 outside the opening 141. A lower end portion of an outer peripheral portion 151 protruding downward on the outer periphery of the plate 150 is provided on an upper surface near the outer periphery of the frame 145 inside the opening 141. The outer peripheral portion 151 of the plate 150 is supported on the frame 145, and the plate 150 defines a space BS surrounded by the outer peripheral portion 151 between the diaphragm 110 and the plate 150.

As shown in FIGS. 1 and 2, the plate 150 has a circular shape and has a center Op on a central axis Ox passing through a center Ov of the diaphragm 110. The plate 150 has an elliptical opening 152 centered on the center Op. The space BS between the plate 150 and the diaphragm 110 communicates with the opening 152.

As shown in FIG. 2, a circular protection portion 155 is provided at the center of the opening 152 of the plate 150. The periphery of the protection portion 155 is supported on the plate 150 by the four bridges 156. The protection portion 155 has a function of adjusting the radiated sound volume and a function of protecting the diaphragm 110 from a foreign object such as the finger of the user.

In the present embodiment, when a current based on an audio signal is applied to the voice coil of the voice coil bobbin 112, the voice coil bobbin 112 and the diaphragm 110 vibrate in an upper-lower direction along the central axis Ox. Accordingly, a sound wave is radiated from the diaphragm 110 in the sound emission direction (the upward direction in FIG. 1), and passes through the opening 152 of the plate 150. At this time, in the present embodiment, resonance is excited in a section from the edge of the opening 152 of the space BS between the plate 150 and the diaphragm 110 to the outer peripheral portion 151. Specifically, this resonance occurs at a frequency at which a distance L from the edge of the opening 152 in the plate 150 to the outer peripheral portion 151 is ¼ wavelength. When this resonance occurs, a first sound wave (that is, a sound wave that excites the resonance) that reaches the opening 152 from the diaphragm 110 and a second sound wave that propagates to the outer peripheral portion 151 via the space B S, that is reflected at the outer peripheral portion 151, and that returns to the opening 152 are in opposite phase, and the sound pressure of the sound radiated from the opening 152 decreases.

In the present embodiment, the distance L from the edge of the opening 152 to the outer peripheral portion 151 is determined based on the target sound pressure frequency characteristic. When a DF characteristic is targeted, it is necessary to reduce the radiated sound level in the band of approximately 2 kHz to 5 kHz (it is necessary to form a dip in the band of approximately 2 kHz to 5 kHz in the frequency characteristics of the radiated sound). Therefore, it is preferable that L=42 mm to 17 mm. When an FF characteristic is targeted, it is necessary to reduce the radiated sound level in the band of approximately 5 kHz to 10 kHz (it is necessary to form a dip in the band of approximately 5 kHz to 10 kHz in the frequency characteristics of the radiated sound). Therefore, it is preferable that L=17 mm to 8 mm. Therefore, in the present embodiment, a preferable range of the distance L from the edge of the opening 152 to the outer peripheral portion 151 is a range of 8 mm to 42 mm.

In the present embodiment, the distance L from the edge of the opening 152 to the outer peripheral portion 151 is changed depending on an angle θ around the center Op of the plate 150. For example, the distance L between the edge of the opening 152 and the outer peripheral portion 151 is continuously changed as the angle around the center of the plate 150 changes. The details are as follows. In FIG. 2, the length from the edge of the opening 152 (a first intersection 153) to the outer peripheral portion 151 (a second intersection 154) in a direction from the center Ov toward a plate outer peripheral portion is denoted by L. In an example shown in FIG. 2, the length L between the first intersection 153 and the second intersection 154 reaches a minimum value when θ=0° and 180°, reaches a maximum value when θ=90° and 270°, and is the length between the maximum value and the minimum value when θ is other angles. In the example shown in FIG. 2, the distance L between the edge of the opening 152 and the outer peripheral portion 151 continuously increases as the angle around the center of the plate 150 changes from 0° to 90°.

When the distance L is changed depending on the angle θ around the center Op of the plate 150 in this way, the frequency range can be widened in which the sound pressure level decreases in the sound pressure frequency characteristic.

Figure 3:
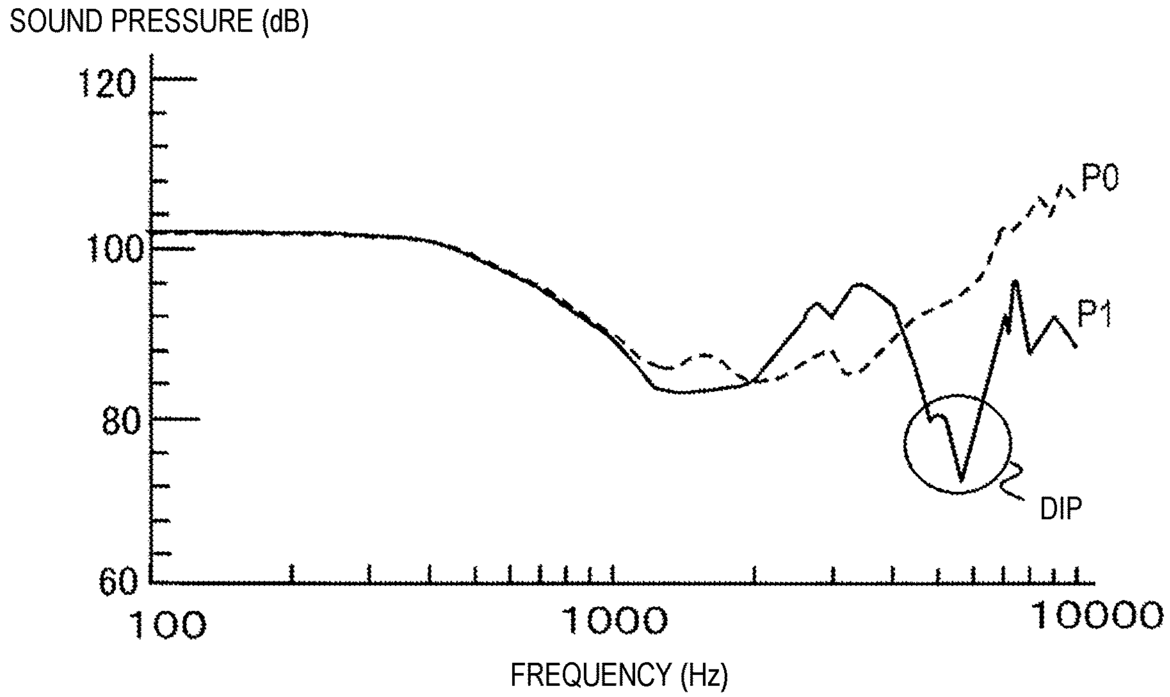
FIG. 3 is a diagram according to the present disclosure.

FIG. 3 is a diagram showing an effect of the embodiment. In FIG. 3, a horizontal axis represents the frequency, and a vertical axis represents the sound pressure level of the headphone. FIG. 3 shows a sound pressure frequency characteristic P0 when the plate 150 is not provided and a sound pressure frequency characteristic P1 when the plate 150 is provided with L described above being 15 mm. When L=15 mm, the frequency of the sound for which L=15 mm is ¼ wavelength is approximately 5800 Hz. Therefore, when the plate 150 having L=15 mm is provided, in the sound pressure frequency characteristic P1 shown in FIG. 3, a dip occurs near 5800 Hz, and a sound pressure frequency characteristic close to the FF characteristic is achieved.

As described above, according to the present embodiment, it is possible to adjust the sound pressure frequency characteristic with high precision targeting a specific band in the speaker unit.

Although the embodiment of the present disclosure has been described above, other embodiments of the present disclosure are possible. The following is an example.

Figure 4:
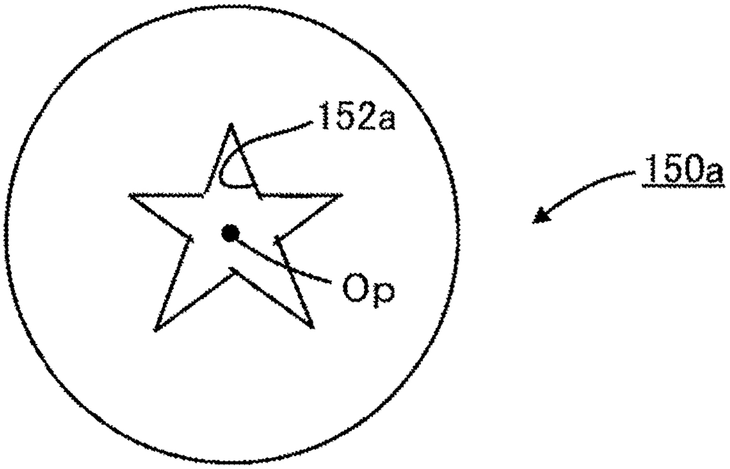
FIG. 4 is a plan view showing a configuration of a plate according to the present disclosure.
Figure 5:
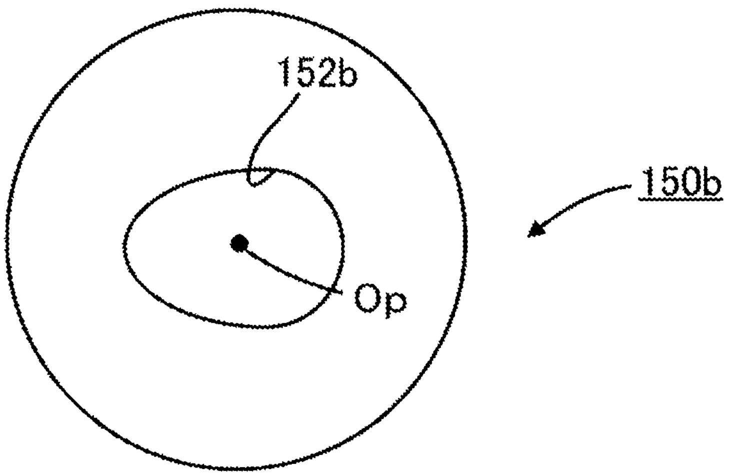
FIG. 5 is a plan view showing a configuration of a plate according to the present disclosure.

In the embodiment described above, the plate 150 has the elliptical opening 152. However, the shape of the opening is not limited to this. The plate 150 may be, for example, a plate 150*a* having a star-shaped opening 152*a* as shown in FIG. 4. For example, as shown in FIG. 5, a plate 150*b* having an egg-shaped opening 152*b* may be used. According to these aspects, since the distance L from the edge of the opening to the outer peripheral portion changes depending on the angle around the center Op of the plate, the frequency range can be widened in which the sound pressure level decreases in the sound pressure frequency characteristic. The shape of the opening may not be a shape such as an elliptical shape, and may be a line-symmetric or point-symmetric shape. For example, as in a plate 150*c* shown in FIG. 6, when the center is shifted from the center Op of the plate 150*c*, in the case of a circular opening 152*c*, the distance L from the edge of the opening to the outer peripheral portion also changes depending on the angle around the center Op of the plate 150*c*. Therefore, the same effect as that of the embodiment described above can be attained. In the egg-shaped opening 152*b* shown in FIG. 5, the distance between the edge of the opening 152*b* and the outer peripheral portion reaches a minimum value when θ=0° and 180°. The distances between the edges of the opening 152*b* shown in FIG. 5 and the opening 152*c* shown in FIG. 6 and the outer peripheral portions continuously increase as the angles around the centers of the plates 150*b* and 150*c* change from 0° to 90°. In the egg-shaped opening 152*b* shown in FIG. 5 and the circular opening 152*c* shown in FIG. 6, the distances between the edges of the openings 152*b* and 152*c* and the outer peripheral portions continuously increase as the angles around the centers of the plates 150*b* and 150*c* change from 0° to 90°.

Figure 6:
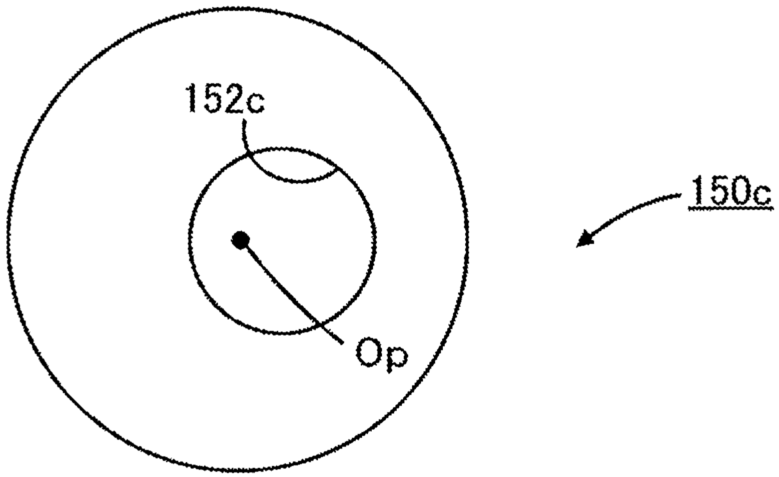
FIG. 6 is a plan view showing a configuration of a plate according to the present disclosure.

In the aspects shown in FIGS. 4 to 6, although illustration of a component corresponding to the protection portion 155 according to the embodiment described above is omitted, the protection portion may or may not be provided.

As described above, the speaker unit according to an aspect of the present disclosure enables adjustment of the sound pressure frequency characteristic with high precision targeting a specific band.

What is claimed is:

1. A speaker unit comprising:

a diaphragm supported on a frame; and a plate including an outer peripheral portion, the outer peripheral portion being supported on the frame, wherein the plate defines a space surrounded by the outer peripheral portion between the plate and the diaphragm and having an opening at a center of the plate, the space communicates with an external space of the plate through the opening, the plate having the opening and the diaphragm functions as a resonator, and thereby sound pressure frequency characteristics of the speaker unit is adjusted, a distance between an edge of the opening and the outer peripheral portion is in a range of 8 mm to 42 mm, and by changing the distance between the edge of the opening and the outer peripheral portion depending on an angle around the center of the plate, a frequency range in which a sound pressure level decreases in the sound pressure frequency characteristic is widened.

2. The speaker unit according to claim 1, wherein the distance between the edge of the opening and the outer peripheral portion continuously changes as the angle around the center of the plate changes.

3. The speaker unit according to claim 2, wherein the distance between the edge of the opening and the outer peripheral portion continuously increases as the angle around the center of the plate changes from 0° to 90°.

4. The speaker unit according to claim 1, wherein the distance between the edge of the opening and the outer peripheral portion reaches a minimum value when the angle around the center of the plate is 0° and 180°, and reaches a maximum value when the angle around the center of the plate is 90° and 270°.

5. The speaker unit according to claim 1, wherein the opening has an elliptical shape.

6. The speaker unit according to claim 1, wherein the opening has a star shape.

7. The speaker unit according to claim 1, wherein the opening has an egg shape.

8. The speaker unit according to claim 1, wherein the opening has a line-symmetric or point-symmetric shape, and the opening is formed such that a center of the opening is shifted from the center of the plate.

9. The speaker unit according to claim 8, wherein the opening has a circular shape.

10. The speaker unit according to claim 1, further comprising:

a protection portion provided in the opening, the protection portion being configured to protect the diaphragm from contacting a foreign object.

11. The speaker unit according to claim 10, wherein the plate includes a bridge connecting the protection portion and the edge of the opening and being configured to support the protection portion.

* * * * *